US012769102B2

(12) United States Patent
Morikuni et al.

(10) Patent No.: US 12,769,102 B2
(45) Date of Patent: Oct. 20, 2026

(54) RELAY SYSTEM, PROJECTION SYSTEM, AND PROJECTOR

(71) Applicant: SEIKO EPSON CORPORATION, Tokyo (JP)

(72) Inventors: Eiji Morikuni, Matsumoto (JP); Kazuyuki Iinuma, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 242 days.

(21) Appl. No.: 18/609,153

(22) Filed: Mar. 19, 2024

(65) Prior Publication Data

US 2024/0319484 A1 Sep. 26, 2024

(30) Foreign Application Priority Data

Mar. 20, 2023 (JP) ................................ 2023-044214

(51) Int. Cl.
*G02B 17/00* (2006.01)
*G02B 17/08* (2006.01)
*G03B 21/28* (2006.01)
*G03B 21/14* (2006.01)

(52) U.S. Cl.
CPC ........... *G02B 17/008* (2013.01); *G02B 17/08* (2013.01); *G03B 21/28* (2013.01); *G03B 21/147* (2013.01)

(58) Field of Classification Search
CPC ...... G02B 17/008; G02B 17/08; G03B 21/28; G03B 21/147
USPC .......................................................... 359/726
See application file for complete search history.

(56) References Cited

U.S. PATENT DOCUMENTS

| | | | | |
|---|---|---|---|---|
| 9,372,328 B2 | 6/2016 | Morikuni | | |
| 9,417,443 B2 * | 8/2016 | Lin | G02B 13/16 | |
| 9,448,464 B2 * | 9/2016 | Lin | G02B 17/08 | |
| 10,025,092 B1 * | 7/2018 | Lin | G02B 13/16 | |
| 2011/0164311 A1 * | 7/2011 | Morikuni | H04N 9/3102 | 359/364 |
| 2014/0176919 A1 * | 6/2014 | Morikuni | G03B 21/28 | 359/364 |
| 2015/0346469 A1 * | 12/2015 | Lin | G02B 13/16 | 353/121 |
| 2016/0116830 A1 * | 4/2016 | Lin | G02B 21/28 | 353/97 |

FOREIGN PATENT DOCUMENTS

JP 2011-138086 A 7/2011

* cited by examiner

*Primary Examiner* — William R Alexander
(74) *Attorney, Agent, or Firm* — Oliff PLC

(57) ABSTRACT

A relay system brings a beam output from a first image plane into focus at a second image plane. The relay system includes a first lens element, a reflection member, and a second lens element sequentially arranged in the direction in which the beam travels. The first lens element has positive power. The reflection member has a transmissive surface that is a concave surface on which the beam is incident and via which the beam exits, and a reflective surface that is a concave surface that reflects the beam from the transmissive surface. The second lens element has positive power. The beam output from the reflection member passes through the second lens element and is brought into focus at the second image plane.

15 Claims, 11 Drawing Sheets

RELAY SYSTEM, PROJECTION SYSTEM, AND PROJECTOR

The present application is based on, and claims priority from JP Application Serial Number 2023-044214, filed Mar. 20, 2023, the disclosure of which is hereby incorporated by reference herein in its entirety.

BACKGROUND

1. Technical Field

The present disclosure relates to a relay system, a projection system, and a projector.

2. Related Art

JP-A-2011-138086 describes a relay system that brings light output from a first image plane into focus at a second image plane with the size of the light unchanged. The relay system described in JP-A-2011-138086 includes a first lens element which has positive refractive power and on which the light output from the first image plane is incident, a reflection member which has positive refractive power and reflects the light having passed through the first lens element, and a second lens element which has positive refractive power, on which the light reflected off the reflection member is incident, and which causes the incident light to be brought into focus at the second image plane. The first and second lens elements is formed of an integral lens member having positive refractive power. The reflection member is formed of a concave mirror.

JP-A-2011-138086 is an example of the related art.

It is desired to reduce the overall length of the system described in JP-A-2011-138086. To reduce the overall length of the relay system, increasing the positive power of the lens member allows reduction in the overall length of the relay system. When the positive power of the lens element is increased, however, a variety of aberrations are likely to be produced, resulting in a problem of deterioration of the optical performance of the relay system.

SUMMARY

To solve the problem described above, a relay system according to an aspect of the present disclosure is a relay system that brings a beam output from a first image plane into focus at a second image plane, the relay system including a first lens element, a reflection member, and a second lens element sequentially arranged in a direction in which the beam travels, the first lens element having positive power, the reflection member having a transmissive surface that is a concave surface on which the beam is incident and via which the beam exits, and a reflective surface that is a concave surface that reflects the beam from the transmissive surface, the second lens element having positive power, the beam output from the first lens element passing through the transmissive surface and reflected off the reflective surface, the beam reflected off the reflective surface passing through the transmissive surface and reaching the second lens element, and the beam output from the reflection member passing through the second lens element and brought into focus at the second image plane.

A projection system according to another aspect of the present disclosure includes the relay system described above, and an enlargement system that enlarges the beam that the relay system brings into focus at the second image plane and projects the enlarged beam onto a third image plane, and the enlargement system is replaceable with the relay system unchanged.

A projector according to another aspect of the present disclosure includes the projection system described above, and a light modulator that forms a projection image at the first image plane.

DESCRIPTION OF EMBODIMENTS

A relay system, a projection system, and a projector according to embodiments of the present disclosure will be described below with reference to the drawings.

Projector

Figure 1:
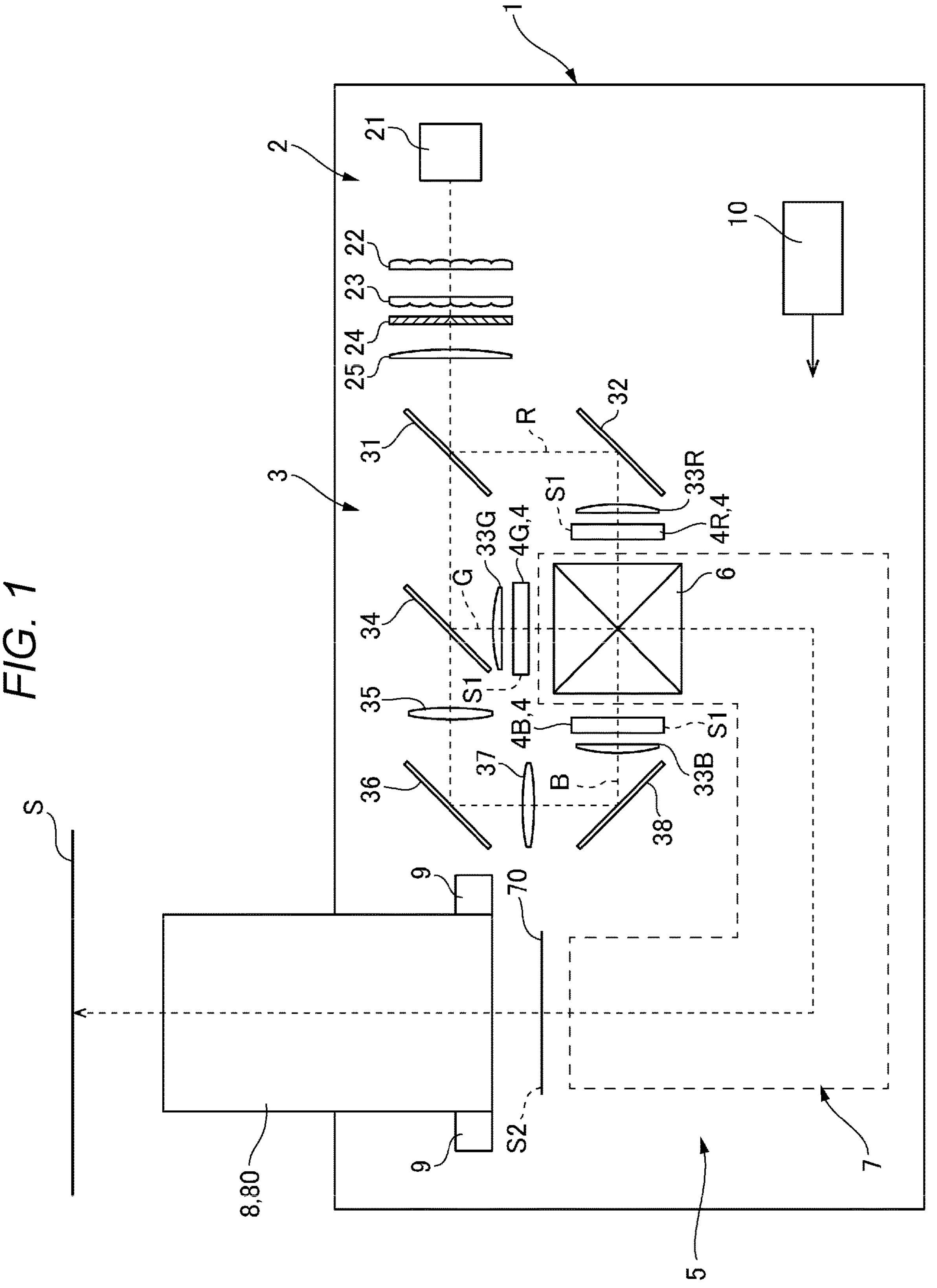
FIG. 1 is a schematic view of key parts of a projector.

FIG. 1 is a schematic view of key parts of a projector 1. The projector 1 includes an illumination system 2, a color separation system 3, which separates light output from the illumination system 2 into a variety of types color light, a plurality of light modulators 4, which modulate the variety of types of color light separated by the color separation system 3 to form projection images, a projection system 5, which projects the projection images formed by the light modulators 4 onto a screen S, and a controller 10, which controls the light modulators 4, as shown in FIG. 1. The projection system 5 includes a relay system 7 and an enlargement system 8. The relay system 7 includes a dichroic prism 6.

The illumination system 2 includes a light source 21, a first optical integration lens 22, a second optical integration lens 23, a polarization converter 24, and a superimposing lens 25. The light source 21 is formed, for example, of an ultrahigh-pressure mercury lamp or a solid-state light source. The first optical integration lens 22 divides the luminous flux from the light source 21 into a plurality of luminous fluxes and brings the luminous fluxes into focus in the vicinity of the second optical integration lens 23. The polarization converter 24 converts the light from the second optical integration lens 23 into predetermined linearly polarized light. The superimposing lens 25 outputs the beam output from the polarization converter 24 toward the color separation system 3.

The color separation system 3 includes a first dichroic mirror 31, a reflection mirror 32, and a field lens 33R. The first dichroic mirror 31 reflects R light, which is part of the beam incident via the superimposing lens 25, and transmits G light and B light, which are part of the beam incident via the superimposing lens 25. The R light reflected off the first dichroic mirror 31 travels via the reflection mirror 32 and the field lens 33R and is incident on a light modulator 4R.

The color separation system 3 includes a second dichroic mirror 34 and a field lens 33G. The second dichroic mirror 34 reflects the G light, which is part of the beam via the first dichroic mirror 31, and transmits the B light, which is part of the beam via the first dichroic mirror 31. The G light reflected off the second dichroic mirror 34 passes through the field lens 33G and is incident on a light modulator 4G.

The color separation system 3 includes a relay lens 35, a reflection mirror 36, a relay lens 37, a reflection mirror 38, and a field lens 33B. The B light having passed through the second dichroic mirror 34 travels via the relay lens 35, the reflection mirror 36, the relay lens 37, the reflection mirror 38, and the field lens 33B and is incident on a light modulator 4B.

The light modulators 4 operate under the control of the controller 10 based on an external image signal such as a video signal. The number of light modulators 4 is three. The light modulators 4 are each a liquid crystal panel in the present embodiment. The light modulator 4R modulates the R light in accordance with the image signal to form a red projection image. The light modulator 4G modulates the G light in accordance with the image signal to form a green projection image. The light modulator 4B modulates the B light in accordance with the image signal to form a blue projection image.

The dichroic prism 6 generates a projection image that is the combination of the variety of types of light modulated by the light modulators 4R, 4G, and 4B. The relay system 7 brings the beam output from a first image plane S1 into focus at a second image plane S2 with the size of the beam unchanged. The enlargement system 8 enlarges the beam that the relay system 7 has brought into focus at the second image plane S2 and projects the enlarged beam onto the screen S (third image plane). In the present embodiment, the light modulators 4 are each disposed at the first image plane S1. The relay system 7 therefore forms an intermediate image 70, which has the same size as the projection image formed at the first image plane, at the second image plane S2. The enlargement system 8 projects an image produced by enlarging the intermediate image 70 onto the screen S.

The enlargement system 8 is a projection lens 80 formed of a plurality of lenses held in a lens barrel. The projector 1 includes a holding mechanism 9, which detachably holds the projection lens 80. The holding mechanism 9 can be any of a variety of mechanisms that can detachably hold the projection lens 80, such as a screw-type, spigot-type, and bayonet-type mechanism. The projector 1 thus allows replacement of the projection lens 80 in accordance with the projection specifications. That is, the enlargement system 8 is replaceable with the relay system 7 unchanged.

First Embodiment

Details of Relay System

Figure 2:
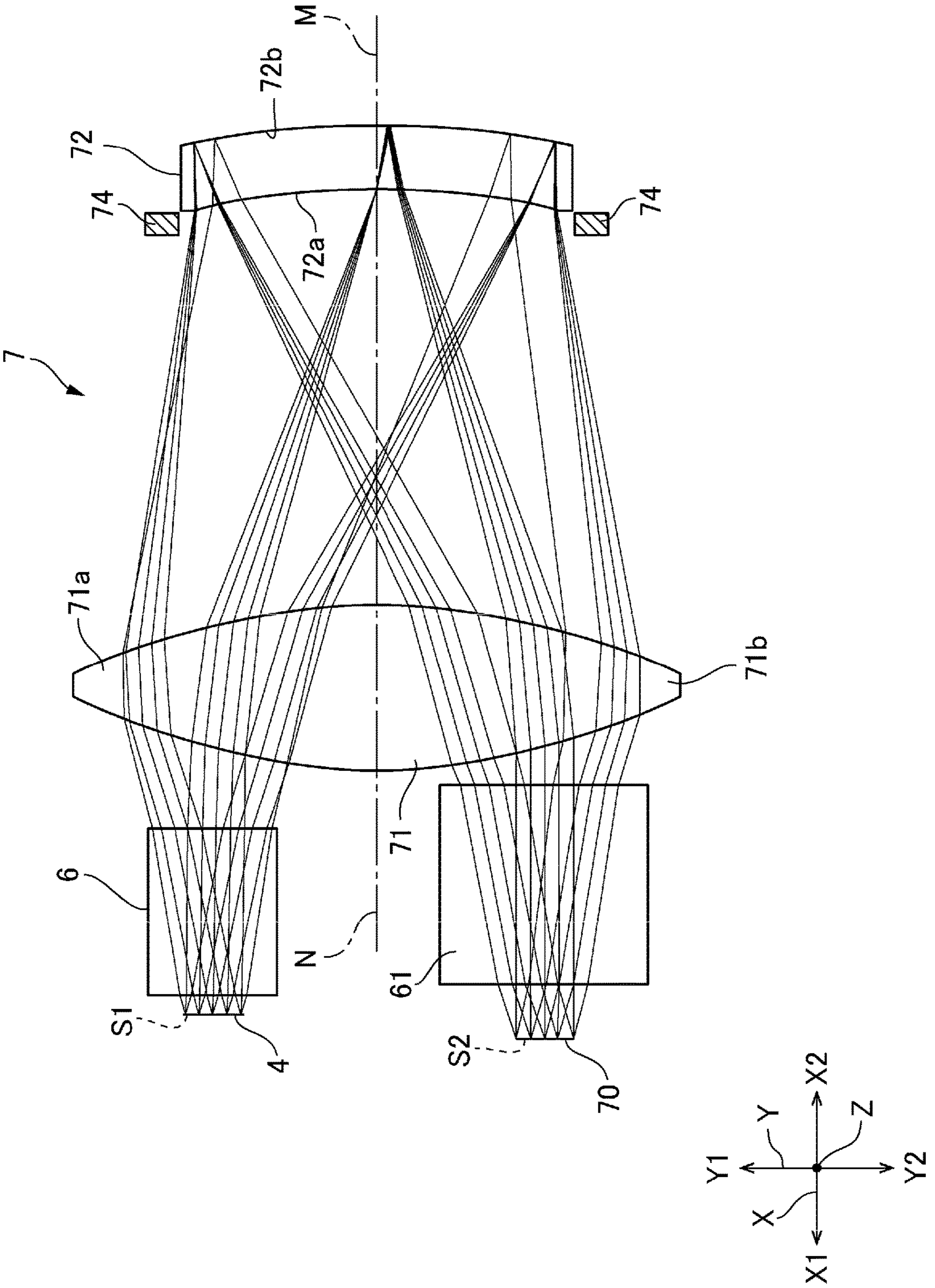
FIG. 2 shows a schematic configuration of a relay system according to a first embodiment.
Figure 3:
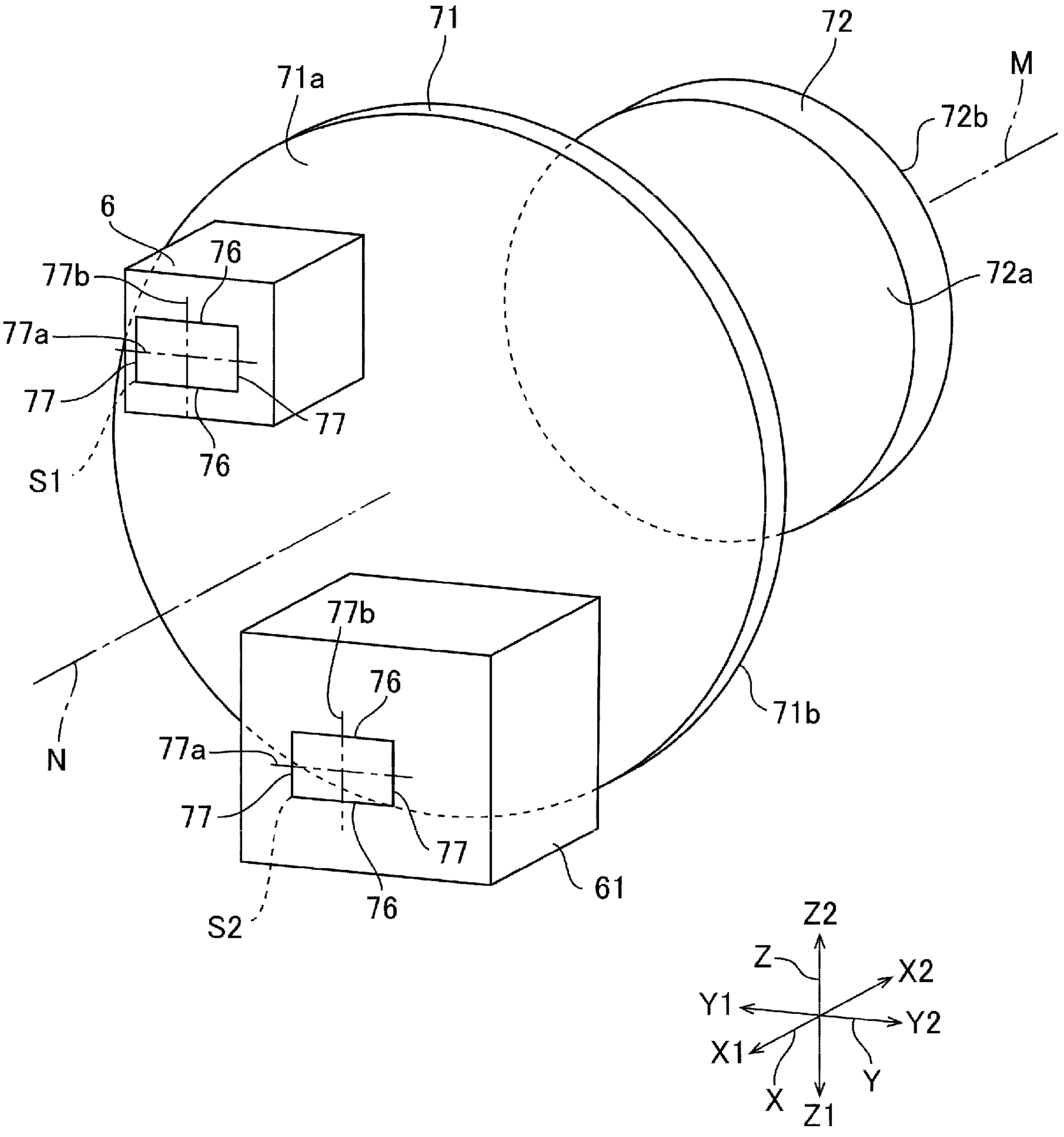
FIG. 3 describes the positional relationship between a first image plane and a second image plane in the relay system.

FIG. 2 shows a schematic configuration of the relay system according to a first embodiment. FIG. 3 describes the positional relationship between the first image plane and the second image plane in the relay system.

The relay system 7 includes a first lens element 71*a*, a reflection member 72, and a second lens element 71*b* sequentially arranged in the direction in which the beam travels from the first image plane S1 toward the second image plane S2, as shown in FIG. 2. The first lens element 71*a* and the second lens element 71*b* are formed of an integral lens member 71 having positive power. In the following description, three axes perpendicular to one another are called an X-axis, a Y-axis, and a Z-axis for convenience. The direction along which the lens member 71 and the reflection member 72 are disposed is called an X-axis direction. In the X-axis direction, X1 represents the side at which the lens member 71 is located, and X2 represents the side at which the reflection member 72 is located. The upward/downward direction is called a Z-axis direction. In the Z-axis direction, Z1 represents the downward side, and Z2 represents the upward side.

The lens member 71 has convex surfaces on opposite sides. The lens member 71 has aspheric surfaces at opposite sides. An optical axis N of the lens member 71 extends in the X-axis direction. The lens member 71 has a shape rotationally symmetrical around the optical axis N. The first lens element 71*a* is located at a position shifted from the optical axis N of the lens member 71 toward Y1, and the second lens element 71*b* is located at a position shifted from the optical axis N of the lens member 71 toward Y2. The first lens element 71*a* and the second lens element 71*b* are therefore lenses having positive power, the same biconvex shape, and the same refractive index. That is, the first lens element 71*a* and the second lens element 71*b* are provided symmetrically with respect to a plane of symmetry containing the optical axis N.

The reflection member 72 has a transmissive surface 72*a* and a reflective surface 72*b*. The transmissive surface 72*a* is located at the side facing X1, and the reflective surface 72*b* is located at the side facing X2. The transmissive surface 72*a* has a concave shape recessed toward the side facing X2. The transmissive surface 72*a* has an aspheric shape.

The reflective surface 72*b* has a concave shape recessed toward the side facing X2. The reflective surface 72*b* has an aspheric shape. The reflective surface 72*b* is formed by providing the X2-side outer surface of the reflection member 72 with a reflective coating layer. An optical axis M of the reflection member 72 extends in the X-axis direction. The transmissive surface 72*a* and the reflective surface 72*b* each have a shape rotationally symmetrical around the optical axis M. That is, the transmissive surface 72*a* and the reflective surface 72*b* have shapes symmetrical with respect to a plane of symmetry containing the optical axis N. The optical axis M of the reflection member 72 coincides with the optical axis N of the lens member 71.

The relay system 7 includes a light adjustment member 74, which is disposed on the optical path between the first lens element 71*a* and the reflection member 72 and restricts the amount of light to be incident on the reflection member 72. The light adjustment member 74 can be a diaphragm that mechanically controls the amount of light, such as a light blocking plate, or a diaphragm that electrically controls the amount of light, such as a liquid crystal apparatus.

The relay system 7 includes the dichroic prism 6 (first optical member), which is disposed between the first image plane S1 and the first lens element 71*a* and through which the beam output from the first image plane S1 passes, and a dummy prism 61 (second optical member), which is disposed between the second lens element 71*b* and the second image plane S2 and through which the beam output from the second lens element 71*b* passes. The dummy prism 61 makes the optical distance between the light exiting surface of the second lens element 71*b* and the second image plane S2 equal to the optical distance between the first image plane S1 and the light incident surface of the first lens element 71*a*.

In the present embodiment, the dichroic prism 6 and the dummy prism 61 have different refractive indices.

The first image plane S1 and the second image plane S2 are each a rectangular image plane having first sides 76 facing each other in the Y-axis direction (first direction) and second sides 77 facing each other in the Z-axis direction (second direction), as shown in FIG. 3. Note in the description that the light modulator 4G is disposed at the first image plane S1. A center line 76*a* of the first image plane S1, which is parallel to the first sides 76, does not overlap with a center line 76*b* of the second image plane S2, which is parallel to the first sides 76. A center line 77*a* of the first image plane S1, which is parallel to the second sides 77, does not overlap with a center line 77*b* of the second image plane S2, which is parallel to the second sides 77. That is, the first image plane S1 and the second image plane S2 are disposed at positions shifted from each other in the Y-axis and Z-axis directions. The dichroic prism 6 and the dummy prism 61, which are disposed between the image planes and the lens member 71, are thus disposed at positions shifted from each other in the Y-axis and Z-axis directions.

The beam output from the first image plane S1 passes through the dichroic prism 6 and the first lens element 71*a* and reaches the reflection member 72, as shown in FIG. 2. The beam output from the first lens element 71*a* passes through the transmissive surface 72*a* and is reflected off the reflective surface 72*b*. The beam reflected off the reflective surface 72*b* passes through the transmissive surface 72*a* and reaches the second lens element 71*b*. The beam output from the reflection member 72 passes through the second lens element 71*b* and the dummy prism 61 and is brought into focus at the second image plane S2. The chief ray of the beam incident on the first lens element 71*a* is parallel to the chief ray of the beam exiting out of the second lens element 71*b*. Note that the state in which "the chief rays are parallel to each other" includes the state in which the chief rays are not completely parallel to each other due, for example, to manufacture errors.

The relay system 7 has a telecentric portion facing the first image plane S1, as shown in FIG. 2. The term "telecentric" means that the chief ray of each luminous flux traveling between the first lens element 71*a* and the light modulators 4 disposed at the first image plane S1 is parallel or substantially parallel to the optical axis of the relay system 7. The term "telecentric" in the present specification means that the angle between the chief ray of each luminous flux and the optical axis of each of the light modulators 4 is smaller than or equal to ±5°.

The relay system 7 has a telecentric portion facing the second image plane S2, as shown in FIG. 2. The term "telecentric" means that the chief ray of each luminous flux traveling between the second lens element 71*b* and the second image plane S2 is parallel or substantially parallel to the optical axis of the relay system 7. The term "telecentric" in the present specification means that the angle between the chief ray of each luminous flux and the optical axis of the second image plane S2 is smaller than or equal to ±5°.

Data on the lenses of the relay system 7 are listed below. The surfaces in the relay system 7 are numbered sequentially from the first image plane S1 to the second image plane S2. Reference characters are given to the first image plane, the dichroic prism, the first lens element, the transmissive surface, the reflective surface, the second lens element, the dummy prism, and the second image plane. An aspheric surface has a surface number preceded by *. R represents the radius of curvature. D represents the axial inter-surface spacing. Nd represents the refractive index at the d line. vd represents the Abbe number at the d line. Y represents the effective radius. R, D, and Y are each expressed in millimeters.

| Reference character | Surface number | R | D | Nd | vd | Mode | Y |
|---|---|---|---|---|---|---|---|
| | 0 | 0.00000 | 0.000000 | | | Refraction | |
| S1 | 1 | 0.00000 | 3.000000 | | | Refraction | 12.748 |
| 6 | 2 | 0.00000 | 25.000000 | 1.5168 | 64.17 | Refraction | 12.748 |
| | 3 | 0.00000 | 8.820000 | | | Refraction | 12.489 |
| 71a | *4 | 75.20938 | 25.000000 | 1.5094 | 56.47 | Refraction | 40.156 |
| | *5 | −86.40080 | 62.953784 | | | Refraction | 40.033 |
| 72a | *6 | −107.98920 | 9.557316 | 1.5094 | 56.47 | Refraction | 26.500 |
| 72b | *7 | −135.20655 | −9.557316 | 1.5094 | 56.47 | Reflection | 26.000 |
| 72a | *8 | −107.98920 | −62.953784 | | | Refraction | 26.500 |
| 71b | *9 | −86.40080 | −25.000000 | 1.5094 | 56.47 | Refraction | 41.729 |
| | *10 | 75.20938 | −2.441341 | | | Refraction | 42.200 |
| 61 | 11 | 0.00000 | −30.000000 | 1.7174 | 29.50 | Refraction | 21.260 |
| | 12 | 0.00000 | −8.305100 | | | Refraction | 21.260 |
| S2 | 13 | 0.00000 | 0.000000 | | | Refraction | 7.547 |

The aspheric coefficients are listed below.

| | Surface number | | | |
|---|---|---|---|---|
| | 4 | 5 | 6 | 7 |
| Conic constant | 0 | 0 | 1.59961E+00 | 0 |
| Fourth-order coefficient | −1.019789E−06 | 4.015744E−07 | 0 | −8.511161E−09 |
| Sixth-order coefficient | 1.443295E−10 | −2.351044E−11 | 0 | −3.574313E−12 |
| Eighth-order coefficient | −7.137023E−15 | 3.063089E−14 | 0 | 7.006635E−15 |

-continued

| | | | | |
|---|---|---|---|---|
| Tenth-order coefficient | −3.472316E−18 | −4.551714E−18 | 0 | −3.002244E−18 |

| | Surface number | | |
|---|---|---|---|
| | 8 | 9 | 10 |
| Conic constant | 1.59961E+00 | 0 | 0 |
| Fourth-order coefficient | 0 | 4.015744E−07 | −1.019789E−06 |
| Sixth-order coefficient | 0 | −2.351044E−11 | 1.443295E−10 |
| Eighth-order coefficient | 0 | 3.063089E−14 | −7.137023E−15 |
| Tenth-order coefficient | 0 | −4.551714E−18 | −3.472316E−18 |

Effects and Advantages

The relay system 7 according to the present embodiment brings the beam output from the first image plane S1 into focus at the second image plane S2 with the size of the beam unchanged. The relay system 7 includes the first lens element 71*a*, the reflection member 72, and the second lens element 71*b* sequentially arranged in the direction in which the beam travels. The first lens element 71*a* has positive power. The reflection member 72 has the transmissive surface 72*a*, which is a concave surface on which the beam is incident and via which the beam exits, and the reflective surface 72*b*, which is a concave surface that reflects the beam from the transmissive surface 72*a*. The second lens element 71*b* has positive power. The beam output from the first image plane S1 passes through the first lens element 71*a* and reaches the reflection member 72. The beam output from the first lens element 71*a* passes through the transmissive surface 72*a* and is reflected off the reflective surface 72*b*. The beam reflected off the reflective surface 72*b* passes through the transmissive surface 72*a* and reaches the second lens element 71*b*. The beam output from the reflection member 72 passes through the second lens element 71*b* and is brought into focus at the second image plane S2.

According to the present embodiment, even when the lens power of each of the first lens element 71*a* and the second lens element 71*b* is increased to reduce the overall length of the relay system 7, the power of the concave transmissive surface 72*a* can suppress the variety of aberrations produced by the first lens element 71*a* and the second lens element 71*b*.

In the present embodiment, the chief ray of the beam incident on the first lens element 71*a* is parallel to the chief ray of the beam exiting out of the second lens element 71*b*. Therefore, when other optical systems are disposed upstream and downstream from the relay system 7, the optical systems are readily combined with the relay system 7 and adjusted with respect thereto because the directions of the chief rays of the luminous fluxes are aligned with one another.

In the present embodiment, the first lens element 71*a* and the second lens element 71*b* are lenses having the same shape and the same refractive index. The first lens element 71*a* and the second lens element 71*b* can therefore be formed of the same lens element, so that the part cost can be suppressed as compared with a case where the first lens element 71*a* and the second lens element 71*b* are formed of different lens elements.

In the present embodiment, the transmissive surface 72*a* and the reflective surface 72*b* have shapes symmetrical with respect to the plane of symmetry containing the optical axis M of the reflection member 72. The first lens element 71*a* and the second lens element 71*b* are provided symmetrically with respect to the plane of symmetry. Therefore, the lens elements are disposed symmetrically with respect to the plane of symmetry, so that the variety of aberrations produced by the first lens element 71*a* can be cancelled out by the variety of aberrations produced by the second lens element 71*b*. The optical performance of the relay system 7 can therefore be improved.

In the present embodiment, the first lens element 71*a* and the second lens element 71*b* is formed of an integral lens member 71 having positive power. The lens member 71 has a shape rotationally symmetrical around the optical axis N of the lens member 71. The number of parts can therefore be reduced. Furthermore, the lens member 71 is readily manufactured.

In the present embodiment, the transmissive surface 72*a* and the reflective surface 72*b* have shapes rotationally symmetrical around the optical axis M of the reflection member 72. The reflection member 72 is therefore readily manufactured.

In the present embodiment, the optical axis N of the lens member 71 coincides with the optical axis M of the reflection member 72. Therefore, when the relay system 7 is manufactured, the lens member 71 and the reflection member 72 are readily assembled.

In the present embodiment, the relay system 7 has a telecentric portion facing the first image plane S1. Therefore, even when the first image plane S1 is slightly defocused in the optical axis direction of the first lens element 71*a*, the shape of the image at the second image plane S2 does not change, so that a satisfactory relay system 7 can be achieved, as compared with a case where the relay system 7 does not have a telecentric portion facing the first image plane S1.

In the present embodiment, the relay system 7 has a telecentric portion facing the second image plane S2. Therefore, even when the second image plane S2 is slightly defocused in the optical axis direction of the second lens element 71*b*, the shape of the image at the second image plane S2 does not change, so that a satisfactory relay system 7 can be achieved, as compared with a case where the relay system 7 does not have a telecentric portion facing the second image plane S2.

In the present embodiment, the relay system 7 includes the light adjustment member 74, which is disposed on the optical path between the first lens element 71*a* and the reflection member 72 and restricts the amount of light to be incident on the reflection member 72. The beam output from the first image plane S1 can therefore be uniformly restricted. The contrast of the image formed at the second image plane S2 can thus be improved.

In the present embodiment, the relay system 7 includes the dichroic prism 6, which is disposed between the first image plane S1 and the first lens element 71*a* and through which the beam output from the first image plane S1 passes, and the dummy prism 61, which is disposed between the second lens element 71*b* and the second image plane S2 and through which the beam output from the second lens element 71*b* passes. The dummy prism 61 makes the optical distance between the light exiting surface of the second lens element 71*b* and the second image plane S2 equal to the optical distance between the first image plane S1 and the light incident surface of the first lens element 71*a*. Therefore, the optical elements of the relay system 7 are disposed in a symmetrical arrangement, so that the variety of aberrations produced by the dichroic prism 6 can be cancelled out by the variety of aberrations produced by the dummy prism 61. The optical performance of the relay system 7 can therefore be improved.

In the present embodiment, the dichroic prism 6 and the dummy prism 61 have different refractive indices. The axial chromatic aberration produced in the relay system 7 can therefore be satisfactorily corrected as compared with a case where the dichroic prism 6 and the dummy prism 61 have the same refractive index.

In the present embodiment, the first image plane S1 and the second image plane S2 are each a rectangular image plane having the first sides 76 facing each other in the Y-axis direction (first direction) and the second sides 77 facing each other in the Z-axis direction (second direction). The center line 76*a* of the first image plane S1, which is parallel to the first sides 76, does not overlap with the center line 76*b* of the second image plane S2, which is parallel to the first sides 76. The center line 77*a* of the first image plane S1, which is parallel to the second sides 77, does not overlap with the center line 77*b* of the second image plane S2, which is parallel to the second sides 77. Therefore, the dichroic prism 6 and the dummy prism 61, which are disposed between the image planes and the lens member 71, can be disposed at positions shifted from each other in the Y-axis and Z-axis directions, so that the dichroic prism 6 and the dummy prism 61 can be laid out with increased flexibility.

The projection system 5 includes the relay system 7 and the enlargement system 8, which enlarges the beam that the relay system 7 has brought into focus at the second image plane S2 and projects the enlarged beam onto the screen S. The enlargement system 8 is replaceable with the relay system 7 unchanged. An enlargement system 8 having any of a variety of back focal lengths can therefore be used, so that the enlargement system 8 can be used with improved flexibility. In this case, the contrast of the projection image projected onto the screen S can be improved by adjusting the beam with the aid of the light adjustment member 74 in accordance with the f-number of the replaced enlargement system 8.

The projector 1 includes the projection system 5, and the light modulators 4, which form projection images at the first image plane S1. An enlargement system 8 having a short back focal length can therefore be used, so that a projector capable of displaying a high-quality image can be achieved.

Figure 4:
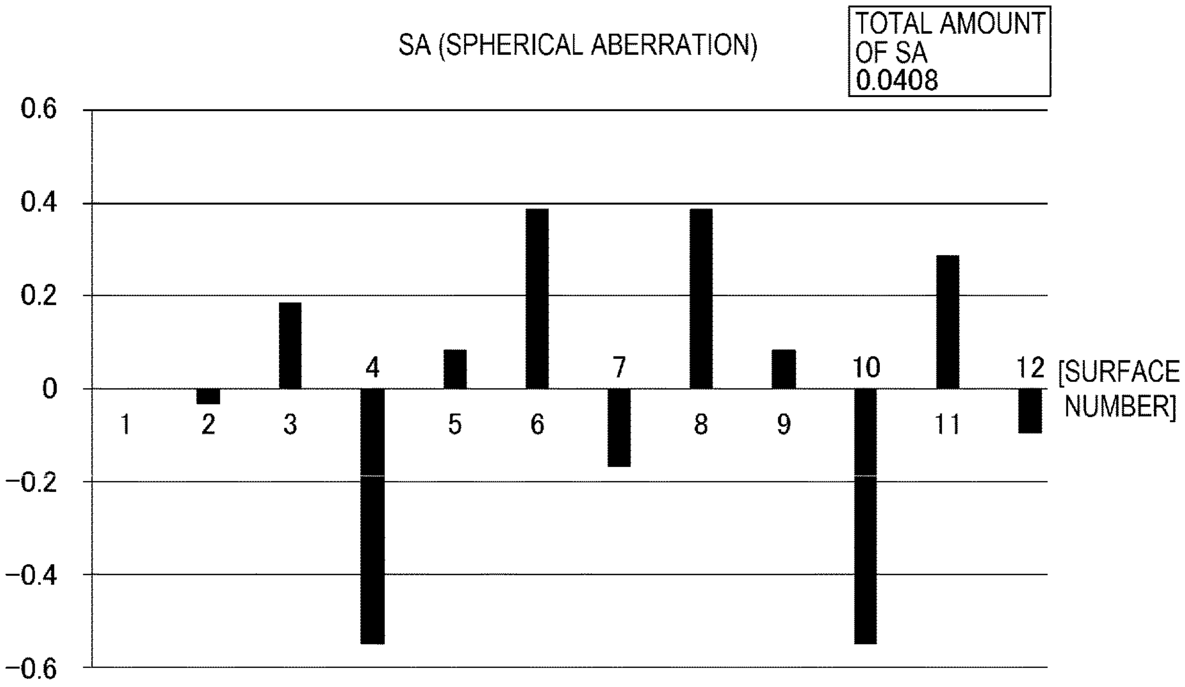
FIG. 4 shows the spherical aberration produced by the relay system.
Figure 5:
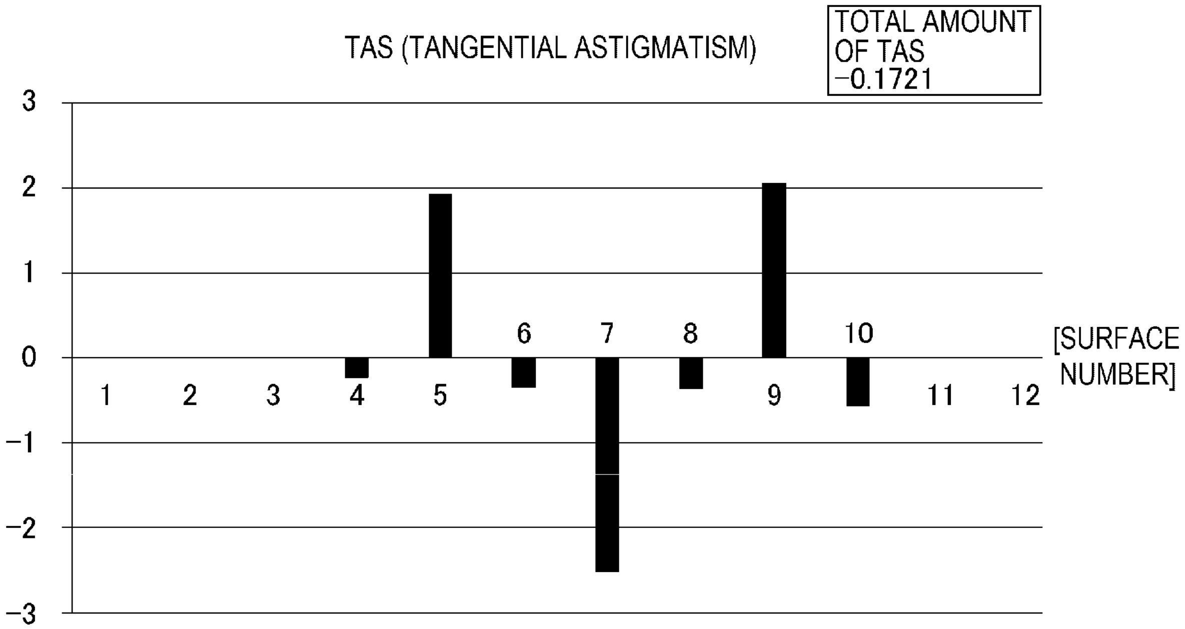
FIG. 5 shows the tangential astigmatism produced by the relay system.
Figure 6:
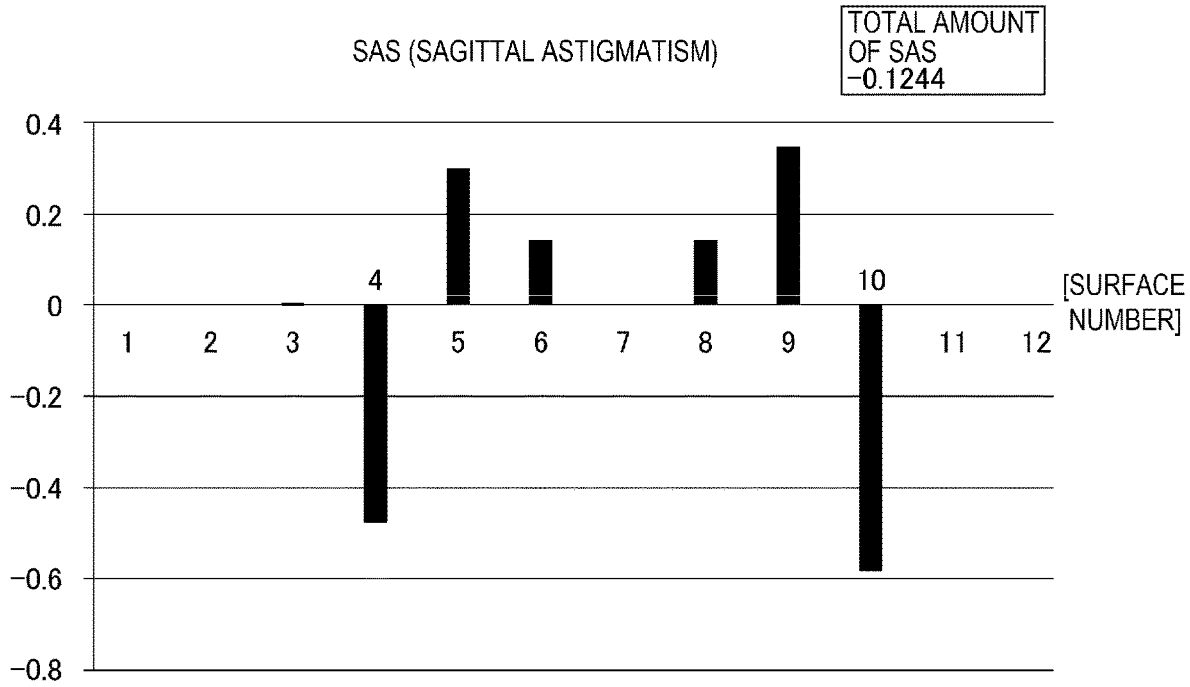
FIG. 6 shows the sagittal astigmatism produced by the relay system.
Figure 7:
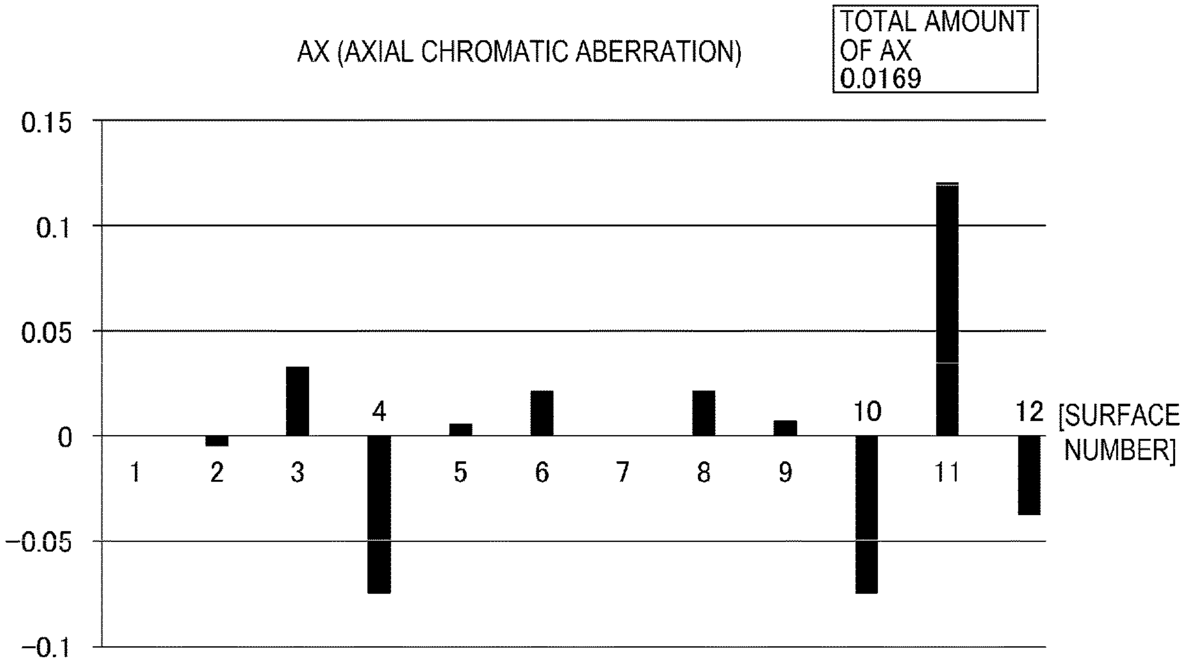
FIG. 7 shows the axial chromatic aberration.

FIG. 4 shows the spherical aberration produced by the relay system 7. FIG. 5 shows the tangential astigmatism produced by the relay system 7. FIG. 6 shows the sagittal astigmatism produced by the relay system 7. FIG. 7 shows the axial chromatic aberration. In each of the aberration diagrams, the vertical axis represents the amount of aberration, and the horizontal axis represents the surface number in the lens data.

The variety of aberrations produced at the light incident surface of the first lens element 71*a* and the light exiting surface of the second lens element 71*b* are cancelled out at the transmissive surface 72*a*, as shown in FIG. 4. The variety of aberrations produced at the light incident surface of the first lens element 71*a* and the light exiting surface of the second lens element 71*b* are cancelled out also by the dummy prism 61. As a result, the total amount of spherical aberration is 0.0408. The spherical aberration produced in the relay system 7 according to the present embodiment is therefore satisfactorily suppressed.

The variety of aberrations produced at the light exiting surface of the first lens element 71*a* and the light incident surface of the second lens element 71*b* are cancelled out at the transmissive surface 72*a*, as shown in FIG. 5. The variety of aberrations produced at the light incident surface of the first lens element 71*a* and the light exiting surface of the second lens element 71*b* are cancelled out at the transmissive surface 72*a*, as shown in FIG. 6. As a result, the total amount of tangential astigmatism is −0.1721, and the total amount of sagittal astigmatism is −0.1244. The astigmatism produced in the relay system 7 according to the present embodiment is therefore satisfactorily suppressed.

The variety of aberrations produced at the light incident surface of the first lens element 71*a* and the light exiting surface of the second lens element 71*b* are cancelled out at the transmissive surface 72*a*, as shown in FIG. 7. The variety of aberrations produced at the light incident surface of the first lens element 71*a* and the light exiting surface of the second lens element 71*b* are cancelled out also by the dummy prism 61. As a result, the total amount of axial chromatic aberration is 0.0169. The axial chromatic aberration produced in the relay system 7 according to the present embodiment is therefore satisfactorily suppressed.

OTHER EMBODIMENTS

Figure 8:
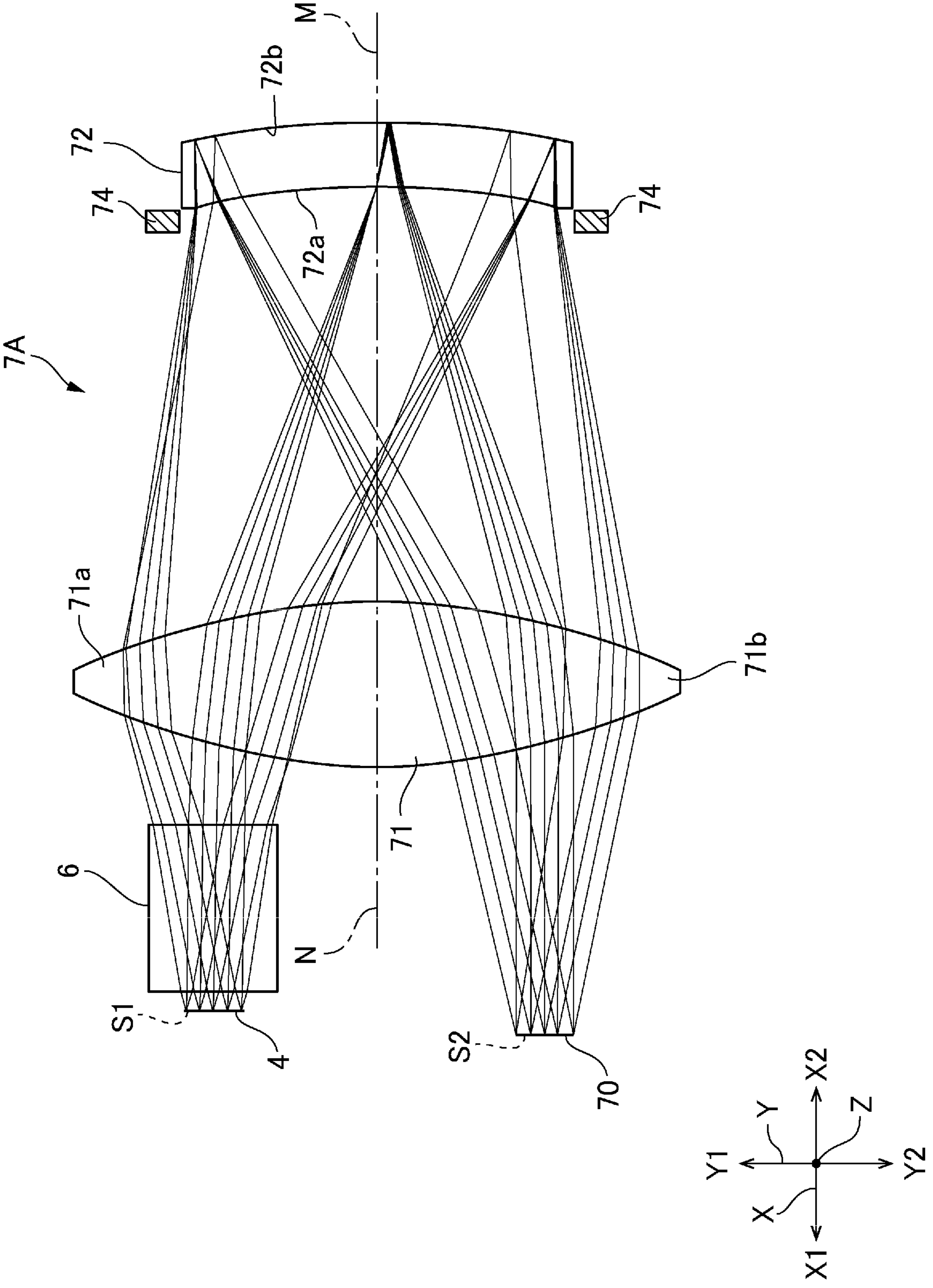
FIG. 8 shows a schematic configuration of the relay system according to a second embodiment.

FIG. 8 shows a schematic configuration of a relay system 7A according to a second embodiment. The relay system 7A may not include the dummy prism 61, as shown in FIG. 8.

Figure 9:
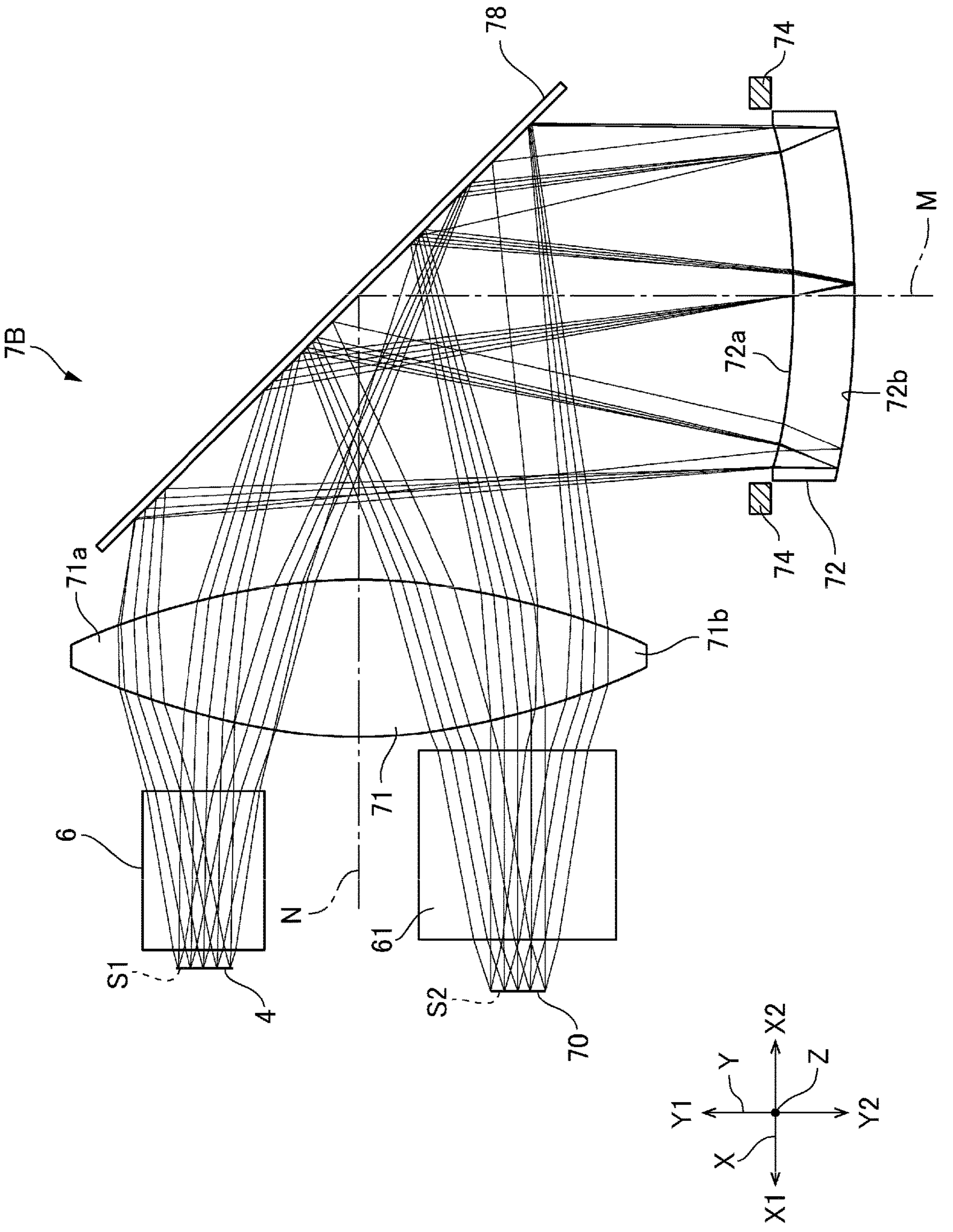
FIG. 9 shows a schematic configuration of the relay system according to a third embodiment.

FIG. 9 shows a schematic configuration of a relay system 7B according to a third embodiment. The relay system 7B includes a first reflection mirror 78, which reflects the beam having passed through the first lens element 71*a* to guide the reflected beam to the reflection member 72 and further reflects the beam reflected off the reflection member 72 to guide the reflected beam to the second lens element 71*b*, as shown in FIG. 9. The relay system 7B can thus fold the optical path, so that the relay system 7B can be a compact relay system. The projection system 5 including the relay system 7B can therefore have a compact configuration, so that the overall projector 1 can be a compact projector.

Figure 10:
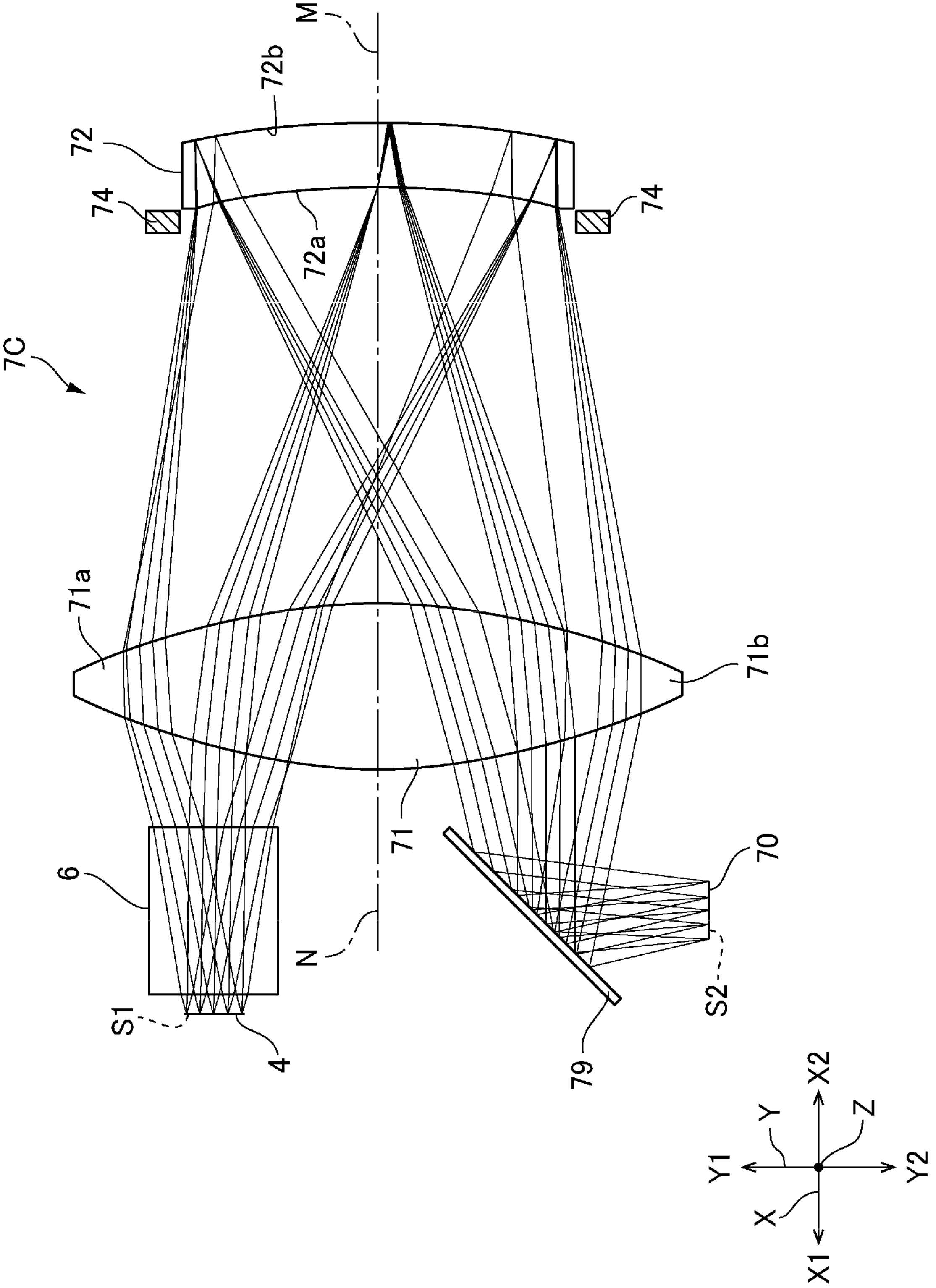
FIG. 10 shows a schematic configuration of the relay system according to a fourth embodiment.

FIG. 10 shows a schematic configuration of a relay system 7C according to a fourth embodiment. The relay system 7C includes a second reflection mirror 79, which reflects the beam having passed through the second lens element 71*b*, as shown in FIG. 10. The second image plane S2 is thus positioned with increased flexibility, and the relay system 7C is therefore readily coupled to the downstream enlargement system 8 without interference with other members.

Figure 11:
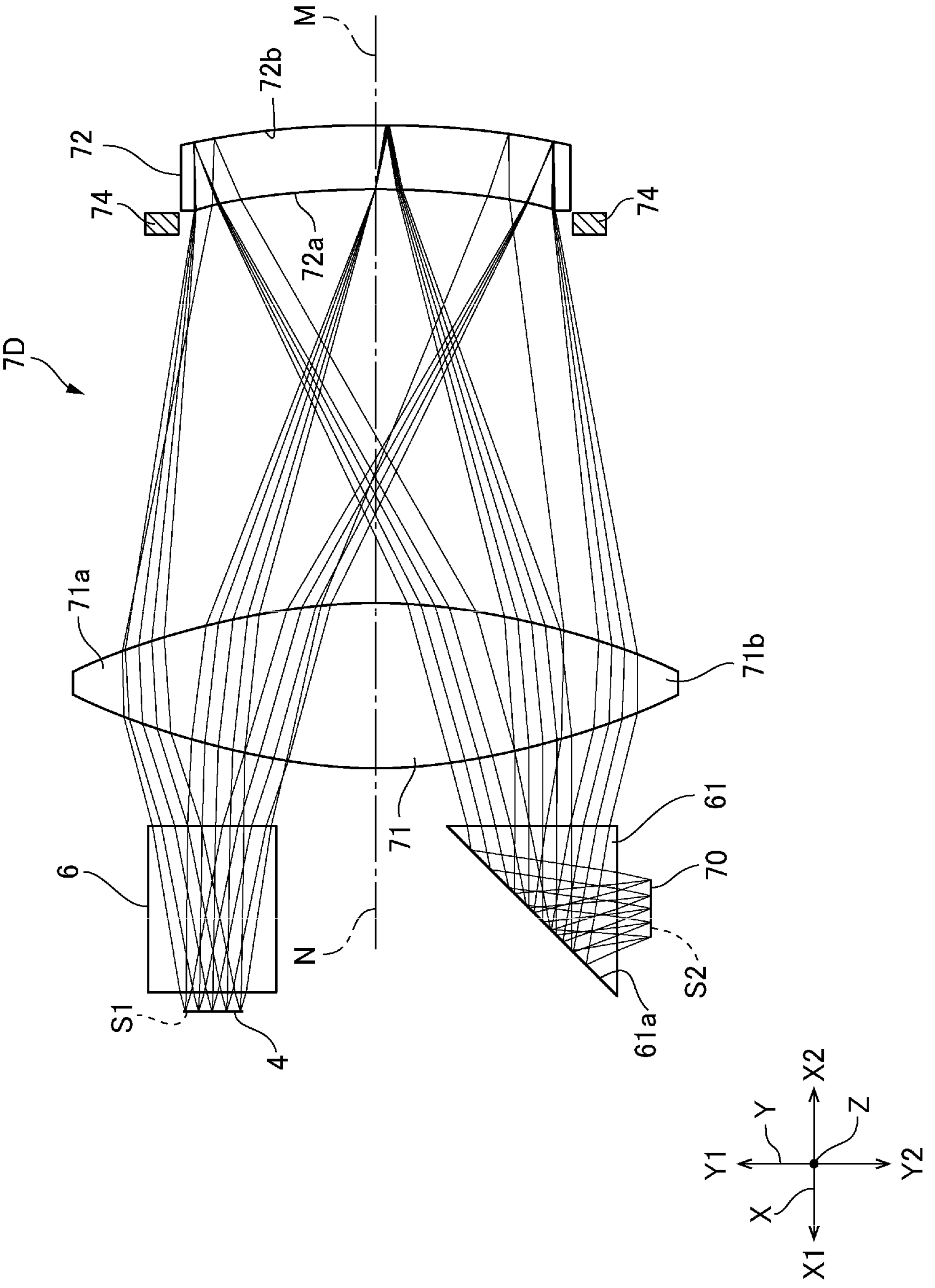
FIG. 11 shows a schematic configuration of the relay system according to a fifth embodiment.

FIG. 11 shows a schematic configuration of a relay system 7D according to a fifth embodiment. In the relay system 7D, the dummy prism 61 includes a reflection film 61*a*, which reflects the beam having passed through the second lens element 71*b*, as shown in FIG. 11. The relay system 7D therefore allows satisfactory correction of the axial chromatic aberration produced in the relay system 7D, as in the first embodiment. Furthermore, the second image plane S2 is positioned with increased flexibility, and the relay system 7D is therefore readily coupled to the downstream enlargement system 8 without interference with other members.

In the embodiments described above, the relay system 7 includes the light adjustment member 74, but may not include the light adjustment member 74. Furthermore, the first lens element 71*a* and the second lens element 71*b* each have a biconvex shape, but not necessarily, and may each have the function of a convex lens, such as a plano-convex lens. That is, the first lens element 71*a* and the second lens element 71*b*, when each considered as a standalone lens, each only need to have positive power.

Summary of Present Disclosure

The present disclosure will be summarized below as additional remarks.

Additional Remark 1

A relay system that brings a beam output from a first image plane into focus at a second image plane, the relay system including a first lens element, a reflection member, and a second lens element sequentially arranged in the direction in which the beam travels, the first lens element having positive power, the reflection member having a transmissive surface that is a concave surface on which the beam is incident and via which the beam exits, and a reflective surface that is a concave surface that reflects the beam from the transmissive surface, the second lens element having positive power, the beam output from the first lens element passing through the transmissive surface and reflected off the reflective surface, the beam reflected off the reflective surface passing through the transmissive surface and reaching the second lens element, and the beam output from the reflection member passing through the second lens element and brought into focus at the second image plane.

Therefore, even when the lens power of each of the first and second lens elements is increased to reduce the overall length of the relay system, the power of the concave transmissive surface can suppress the variety of aberrations produced by the first and second lens elements.

Additional Remark 2

The relay system described in the additional remark 1, in which the chief ray of the beam incident on the first lens element is parallel to the chief ray of the beam exiting out of the second lens element.

Therefore, when other optical systems are disposed upstream and downstream from the relay system, the optical systems are readily combined with the relay system and adjusted with respect thereto because the directions of the chief rays of the beams are aligned with one another.

Additional Remark 3

The relay system described in the additional remark 1 or 2, further including a first reflection mirror that reflects the beam having passed through the first lens element to guide the beam to the reflection member and further reflects the beam reflected off the reflection member to guide the beam to the second lens element.

The relay system can thus fold the optical path, so that the relay system can be a compact relay system.

Additional Remark 4

The relay system described in any one of the additional remarks 1 to 3, further including a second reflection mirror that reflects the beam having passed through the second lens element.

The second image plane is thus positioned with increased flexibility, so that the relay system is readily coupled to the downstream optical system without interference with other members.

Additional Remark 5

The relay system described in any one of the additional remarks 1 to 4, in which the first and second lens elements are lenses having the same shape and the same refractive index.

The first and second lens elements can therefore be formed of the same lens element, so that the part cost can be suppressed as compared with the case where the first and second lens elements are formed of different lens elements.

Additional Remark 6

The relay system described in the additional remark 5, in which the transmissive surface and the reflective surface have shapes symmetrical with respect to a plane of symmetry containing the optical axis of the reflection member, and the first and second lens elements are provided symmetrically with respect to the plane of symmetry.

Therefore, the lens elements are disposed symmetrically with respect to the plane of symmetry, so that the variety of aberrations produced by the first lens element can be cancelled out by the variety of aberrations produced by the second lens element. The optical performance of the relay system can therefore be improved.

Additional Remark 7

The relay system described in the additional remark 6, in which the first and second lens elements are formed of an integral lens member having positive power, and the lens member has a shape rotationally symmetrical around the optical axis of the lens member.

The number of parts can therefore be reduced. Furthermore, the lens member is readily manufactured.

Additional Remark 8

The relay system described in the additional remark 6, in which the transmissive surface and the reflective surface each have a shape rotationally symmetrical around the optical axis of the reflection member.

The reflection member is therefore readily manufactured.

Additional Remark 9

The relay system described in any one of the additional remarks 1 to 8, in which the relay system has a telecentric portion facing the first image plane.

Therefore, even when the first image plane is slightly defocused in the optical axis direction of the first lens element, the shape of the image at the second image plane does not change, so that a satisfactory relay system can be achieved, as compared with the case where the relay system does not have a telecentric portion facing the first image plane.

Additional Remark 10

The relay system described in any one of the additional remarks 1 to 9, in which the relay system has a telecentric portion facing the second image plane.

Therefore, even when the second image plane is slightly defocused in the optical axis direction of the second lens element, the shape of the image at the second image plane does not change, so that a satisfactory relay system can be achieved, as compared with the case where the relay system does not have a telecentric portion facing the second image plane.

Additional Remark 11

The relay system described in any one of the additional remarks 1 to 10, further including a light adjustment member that is disposed on the optical path between the first lens element and the reflection member and restricts the amount of light to be incident on the reflection member.

The beam output from the first image plane can therefore be uniformly restricted, so that the contrast of the image formed at the second image plane can be improved.

Additional Remark 12

The relay system described in any one of the additional remarks 1 to 11, in which the beam output from the first image plane is brought into focus at the second image plane with the size of the beam unchanged.

Additional Remark 13

The relay system described in any one of the additional remarks 1 to 12, further including a first optical member that is disposed between the first image plane and the first lens element and transmits the beam output from the first image plane, and a second optical member that is disposed between the second lens element and the second image plane and transmits the beam output from the second lens element, the second optical member making the optical distance between the light exiting surface of the second lens element and the second image plane equal to the optical distance between the first image plane and the light incident surface of the first lens element.

The optical elements of the relay system are therefore disposed in a symmetrical arrangement, so that the variety of aberrations produced by the first optical member can be cancelled out by the variety of aberrations produced by the second optical member. The optical performance of the relay system can therefore be improved.

Additional Remark 14

The relay system described in the additional remark 13, in which the first and second optical members have different refractive indices.

The axial chromatic aberration produced in the relay system can therefore be satisfactorily corrected as compared with the case where the first and second optical members have the same refractive index.

Additional Remark 15

The relay system described in the additional remark 13 or 14, in which the second optical member includes a reflection film that reflects the beam having passed through the second lens element.

The second image plane is thus positioned with increased flexibility, so that the relay system is readily coupled to the downstream optical system without interference with other members.

Additional Remark 16

The relay system described in any one of the additional remarks 1 to 15, in which the first and second image planes are each a rectangular image plane having first sides facing each other in a first direction and second sides facing each other in a second direction perpendicular to the first direction, a center line of the first image plane that is parallel to the first sides does not overlap with a center line of the second image plane that is parallel to the first sides, and a center line of the first image plane that is parallel to the second sides does not overlap with a center line of the second image plane that is parallel to the second sides.

The first and second optical members, which are disposed between the image planes and the lens member, can be disposed at positions shifted from each other in the first and second directions, so that the first and second optical members can be laid out with increased flexibility.

Additional Remark 17

A projection system including the relay system described in any one of the additional remarks 1 to 16, and an enlargement system that enlarges the beam that the relay system has brought into focus at the second image plane and projects the enlarged beam onto a third image plane.

An enlarged image that is an enlarged second image plane can thus be projected.

Additional Remark 18

The projection system described in the additional remark 17, in which the enlargement system is replaceable with the relay system unchanged.

An enlargement system having any of a variety of back focal lengths can therefore be used, so that the enlargement system can be used with improved flexibility.

Additional Remark 19

A projector including the projection system described in the additional remark 17 or 18, and a light modulator that forms a projection image at the first image plane.

An enlargement system having a short back focal length can therefore be used, so that a projector capable of displaying a high-quality image can be achieved.

What is claimed is:

1. A relay system that brings a beam output from a first image plane into focus at a second image plane, the relay system comprising:

a first lens element; a reflection member; and a second lens element sequentially arranged in a direction in which the beam travels, wherein the first lens element has positive power, the reflection member has a transmissive surface that is a concave surface on which the beam is incident and via which the beam exits, and a reflective surface that is a concave surface that reflects the beam from the transmissive surface, the second lens element has positive power, the beam output from the first lens element passes through the transmissive surface and is reflected off the reflective surface, the beam reflected off the reflective surface passes through the transmissive surface and reaches the second lens element, the beam output from the reflection member passes through the second lens element and is brought into focus at the second image plane, the first and second lens elements are lenses having the same shape and the same refractive index, the transmissive surface and the reflective surface have shapes symmetrical with respect to a plane of symmetry containing an optical axis of the reflection member, the first and second lens elements are provided symmetrically with respect to the plane of symmetry, the transmissive surface and the reflective surface each have a shape rotationally symmetrical around the optical axis of the reflection member.

2. The relay system according to claim 1, wherein a chief ray of the beam incident on the first lens element is parallel to a chief ray of the beam exiting out of the second lens element.

3. The relay system according to claim 1, further comprising a first reflection mirror that reflects the beam passing through the first lens element to guide the beam to the reflection member and further reflects the beam reflected off the reflection member to guide the beam to the second lens element.

4. The relay system according to claim 1, further comprising a second reflection mirror that reflects the beam passing through the second lens element.

5. The relay system according to claim 1, wherein the first and second lens elements are formed of an integral lens member having positive power, and the lens member has a shape rotationally symmetrical around an optical axis of the lens member.

6. The relay system according to claim 1, wherein the relay system has a telecentric portion facing the first image plane.

7. The relay system according to claim 1, wherein the relay system has a telecentric portion facing the second image plane.

8. The relay system according to claim 1, further comprising a light adjustment member that is disposed on an optical path between the first lens element and the reflection member and restricts an amount of light to be incident on the reflection member.

9. The relay system according to claim 1, wherein the beam output from the first image plane is brought into focus at the second image plane with the size of the beam unchanged.

10. The relay system according to claim 1, further comprising:

a first optical member that is disposed between the first image plane and the first lens element and transmits the beam output from the first image plane; and a second optical member that is disposed between the second lens element and the second image plane and transmits the beam output from the second lens element, wherein the second optical member makes an optical distance between a light exiting surface of the second lens element and the second image plane equal to an optical distance between the first image plane and a light incident surface of the first lens element.

11. The relay system according to claim 10, wherein the first and second optical members have different refractive indices.

12. The relay system according to claim 10, wherein the second optical member includes a reflection film that reflects the beam passing through the second lens element.

13. The relay system according to claim 1, wherein the first and second image planes are each a rectangular image plane having first sides facing each other in a first direction and second sides facing each other in a second direction perpendicular to the first direction, a center line of the first image plane that is parallel to the first sides does not overlap with a center line of the second image plane that is parallel to the first sides, and a center line of the first image plane that is parallel to the second sides does not overlap with a center line of the second image plane that is parallel to the second sides.

14. A projection system comprising:

a relay system that brings a beam output from a first image plane into focus at a second image plane, the relay system including a first lens element, a reflection member and a second lens element sequentially arranged in a direction in which the beam travels; and an enlargement system that enlarges the beam that the relay system brings into focus at the second image plane and projects the enlarged beam onto a third image plane, wherein the first lens element has positive power, the reflection member has a transmissive surface that is a concave surface on which the beam is incident and via which the beam exits, and a reflective surface that is a concave surface that reflects the beam from the transmissive surface, the second lens element has positive power, the beam output from the first lens element passes through the transmissive surface and is reflected off the reflective surface, the beam reflected off the reflective surface passes through the transmissive surface and reaches the second lens element, the beam output from the reflection member passes through the second lens element and is brought into focus at the second image plane, and the enlargement system is replaceable with the relay system unchanged.

15. A projector comprising:

a relay system that brings a beam output from a first image plane into focus at a second image plane, the relay system including a first lens element, a reflection member and a second lens element sequentially arranged in a direction in which the beam travels;

an enlargement system that enlarges the beam that the relay system brings into focus at the second image plane and projects the enlarged beam onto a third image plane; and a light modulator that forms a projection image at the first image plane, wherein the first lens element has positive power, the reflection member has a transmissive surface that is a concave surface on which the beam is incident and via which the beam exits, and a reflective surface that is a concave surface that reflects the beam from the transmissive surface, the second lens element has positive power, the beam output from the first lens element passes through the transmissive surface and is reflected off the reflective surface, the beam reflected off the reflective surface passes through the transmissive surface and reaches the second lens element, the beam output from the reflection member passes through the second lens element and is brought into focus at the second image plane.

* * * * *